US011228156B2

(12) United States Patent
Ueno et al.

(10) Patent No.: US 11,228,156 B2
(45) Date of Patent: Jan. 18, 2022

(54) LASER SYSTEM AND EXTREME ULTRAVIOLET LIGHT GENERATION SYSTEM

(71) Applicant: Gigaphoton Inc., Tochigi (JP)

(72) Inventors: Yoshifumi Ueno, Tochigi (JP); Yuta Takashima, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 272 days.

(21) Appl. No.: 16/534,806

(22) Filed: Aug. 7, 2019

(65) Prior Publication Data

US 2019/0363508 A1    Nov. 28, 2019

Related U.S. Application Data

(63) Continuation of application No. PCT/JP2017/012676, filed on Mar. 28, 2017.

(51) Int. Cl.
*H01S 3/23*     (2006.01)
*H01S 3/00*     (2006.01)
(Continued)

(52) U.S. Cl.
CPC .......... *H01S 3/2308* (2013.01); *H01S 3/0014* (2013.01); *H01S 3/0071* (2013.01);
(Continued)

(58) Field of Classification Search
CPC .... H01S 3/2308; H01S 3/0014; H01S 3/0071; H01S 3/034; H01S 3/10007; H01S 3/1024
See application file for complete search history.

(56) References Cited

U.S. PATENT DOCUMENTS

2006/0119828 A1   6/2006   Ito et al.
2010/0117009 A1   5/2010   Moriya et al.
(Continued)

FOREIGN PATENT DOCUMENTS

JP     S61-155833 A    7/1986
JP     S62-173629 A    7/1987
(Continued)

OTHER PUBLICATIONS

International Search Report issued in PCT/JP2017/012676; dated Jun. 13, 2017.
International Preliminary Report On Patentability and Written Opinion issued in PCT/JP2017/012676; dated Oct. 1, 2019.

*Primary Examiner* — Yuanda Zhang
(74) *Attorney, Agent, or Firm* — Studebaker & Brackett PC

(57) ABSTRACT

A laser system according to the present disclosure includes: a laser apparatus configured to emit a laser beam; a transmission optical system disposed on a path between the laser apparatus and a target supplied into an EUV chamber in which EUV light is generated; a reflection optical system configured to reflect, toward the target, the laser beam from the transmission optical system; a first sensor configured to detect the laser beam traveling from the laser apparatus toward the reflection optical system; a second sensor configured to detect return light of the laser beam reflected by the reflection optical system and traveling backward to the laser apparatus; and a control unit configured to determine that the reflection optical system is damaged when no anomaly of the laser beam is detected and a light amount of the return light exceeds a predetermined light amount value.

11 Claims, 12 Drawing Sheets

(51) Int. Cl.
  *H01S 3/034* (2006.01)
  *H01S 3/10* (2006.01)
  *H01S 3/102* (2006.01)
  *H01S 3/13* (2006.01)
  *H01S 3/223* (2006.01)

(52) U.S. Cl.
  CPC .......... *H01S 3/034* (2013.01); *H01S 3/10007* (2013.01); *H01S 3/1024* (2013.01); *H01S 3/1304* (2013.01); *H01S 3/2232* (2013.01)

(56) References Cited

U.S. PATENT DOCUMENTS

2013/0119232 A1*  5/2013  Moriya ............... G03F 7/70258
                                                      250/201.1
2014/0346374 A1  11/2014  Yanagida et al.
2017/0317464 A1  11/2017  Kurosawa et al.

FOREIGN PATENT DOCUMENTS

| | | | | |
|---|---|---|---|---|
| JP | 2006-134974 A | 5/2006 | | |
| JP | 2008-103545 A | 5/2008 | | |
| JP | 2012-147022 A | 8/2012 | | |
| JP | 2013-218286 A | 10/2013 | | |
| JP | 2014-041828 A | 3/2014 | | |
| WO | WO-2013104947 A1 * | 7/2013 | ............ | B23K 26/06 |
| WO | 2016-142995 A1 | 9/2016 | | |

* cited by examiner

LASER SYSTEM AND EXTREME ULTRAVIOLET LIGHT GENERATION SYSTEM

CROSS-REFERENCE TO RELATED APPLICATIONS

The present application is a continuation application of International Application No. PCT/JP2017/012676 filed on Mar. 28, 2017. The content of the application is incorporated herein by reference in its entirety.

BACKGROUND

1. Technical Field

The present disclosure relates to a laser system and an extreme ultraviolet (EUV) light generation system.

2. Related Art

Recently, miniaturization of a transfer pattern in optical lithography of a semiconductor process has been rapidly proceeding along with miniaturization of the semiconductor process. Minute fabrication at 20 nm or smaller will be required in the next generation technology. To meet such a requirement, it is expected to develop an exposure apparatus including a device for generating an extreme ultraviolet (EUV) light at a wavelength of approximately 13 nm in combination with a reflection optical system of reduced projection.

Disclosed EUV light generation devices include the three kinds of devices of a laser produced plasma (LPP) device that uses plasma generated by irradiating a target material with a pulse laser beam, a discharge produced plasma (DPP) device that uses plasma generated by electrical discharge, and a synchrotron radiation (SR) device that uses synchrotron radiation.

LIST OF DOCUMENTS

Patent Documents

Patent Document 1: Japanese Unexamined Patent Application Publication No. 62-173629
Patent Document 2: International Patent Publication No. 2016/142995
Patent Document 3: Japanese Unexamined Patent Application Publication No. 61-155833

SUMMARY

A laser system of the present disclosure includes: a laser apparatus configured to emit a laser beam; a transmission optical system disposed on a path between the laser apparatus and a target supplied into an EUV chamber in which EUV light is generated; a reflection optical system disposed on a path between the transmission optical system and the target and configured to reflect, toward the target, the laser beam from the transmission optical system; a first sensor provided on a path between the transmission optical system and the reflection optical system and configured to detect the laser beam traveling from the laser apparatus toward the reflection optical system; a second sensor provided on a path from the reflection optical system into the laser apparatus and configured to detect return light of the laser beam reflected by the reflection optical system and traveling backward to the laser apparatus; and a control unit configured to determine that the reflection optical system is damaged when no anomaly of the laser beam is detected by the first sensor and a light amount of the return light detected by the second sensor exceeds a predetermined light amount value.

An EUV light generation system of the present disclosure includes: an EUV chamber in which EUV light is generated; a laser apparatus configured to emit a laser beam; a transmission optical system disposed on a path between the laser apparatus and a target supplied into the EUV chamber; a reflection optical system disposed on a path between the transmission optical system and the target and configured to reflect, toward the target, the laser beam from the transmission optical system; a first sensor provided on a path between the transmission optical system and the reflection optical system and configured to detect the laser beam traveling from the laser apparatus toward the reflection optical system; a second sensor provided on a path from the reflection optical system into the laser apparatus and configured to detect return light of the laser beam reflected by the reflection optical system and traveling backward to the laser apparatus; and a control unit configured to determine that the reflection optical system is damaged when no anomaly of the laser beam is detected by the first sensor and a light amount of the return light detected by the second sensor exceeds a predetermined light amount value.

BRIEF DESCRIPTION OF THE DRAWINGS

Embodiments of the present disclosure will be described below as examples with reference to the accompanying drawings.

DESCRIPTION OF EMBODIMENTS

<Contents>
<1. Overal description of EUV light generation device> (FIG. 1)
  1.1 Configuration
  1.2 Operation
<2. Comparative example> (laser system including laser beam transmission device) (FIG. 2)
  2.1 Configuration
  2.2 Operation
  2.3 Problem
<3. Embodiment 1> (laser system including return light sensor configured to detect return light of main pulse laser beam) (FIGS. 3 and 4)
  3.1 Configuration
  3.2 Operation
  3.3 Effect
<4. Embodiment 2> (laser system including return light sensor inside main pulse laser device) (FIGS. 5 and 6)
  4.1 Configuration
  4.2 Operation
  4.3 Effect <5. Embodiment 3> (laser system capable of diagnosing damage of chamber window) (FIGS. 7 and 8)
  5.1 Configuration
  5.2 Operation
  5.3 Effect
<6. Embodiment 4>(laser system including return light sensor configured to detect return light of pre-pulse laser beam) (FIGS. 9 and 10)
  6.1 Configuration
  6.2 Operation
  6.3 Effect
<7. Embodiment 5> (laser system including return light sensor inside pre-pulse laser device) (FIGS. 11 and 12)
  7.1 Configuration
  7.2 Operation
  7.3 Effect
<8. Others>

Embodiments of the present disclosure will be described below in detail with reference to the accompanying drawings.

The embodiments described below are examples of the present disclosure, and do not limit the contents of the present disclosure. All of configurations and operations described in each embodiment are not necessarily essential as configurations and operations of the present disclosure.

Components identical to each other are denoted by an identical reference sign, and duplicate description thereof will be omitted.

<1. Overall Description of EUV Light Generation Device>

[1.1 Configuration]

Figure 1:
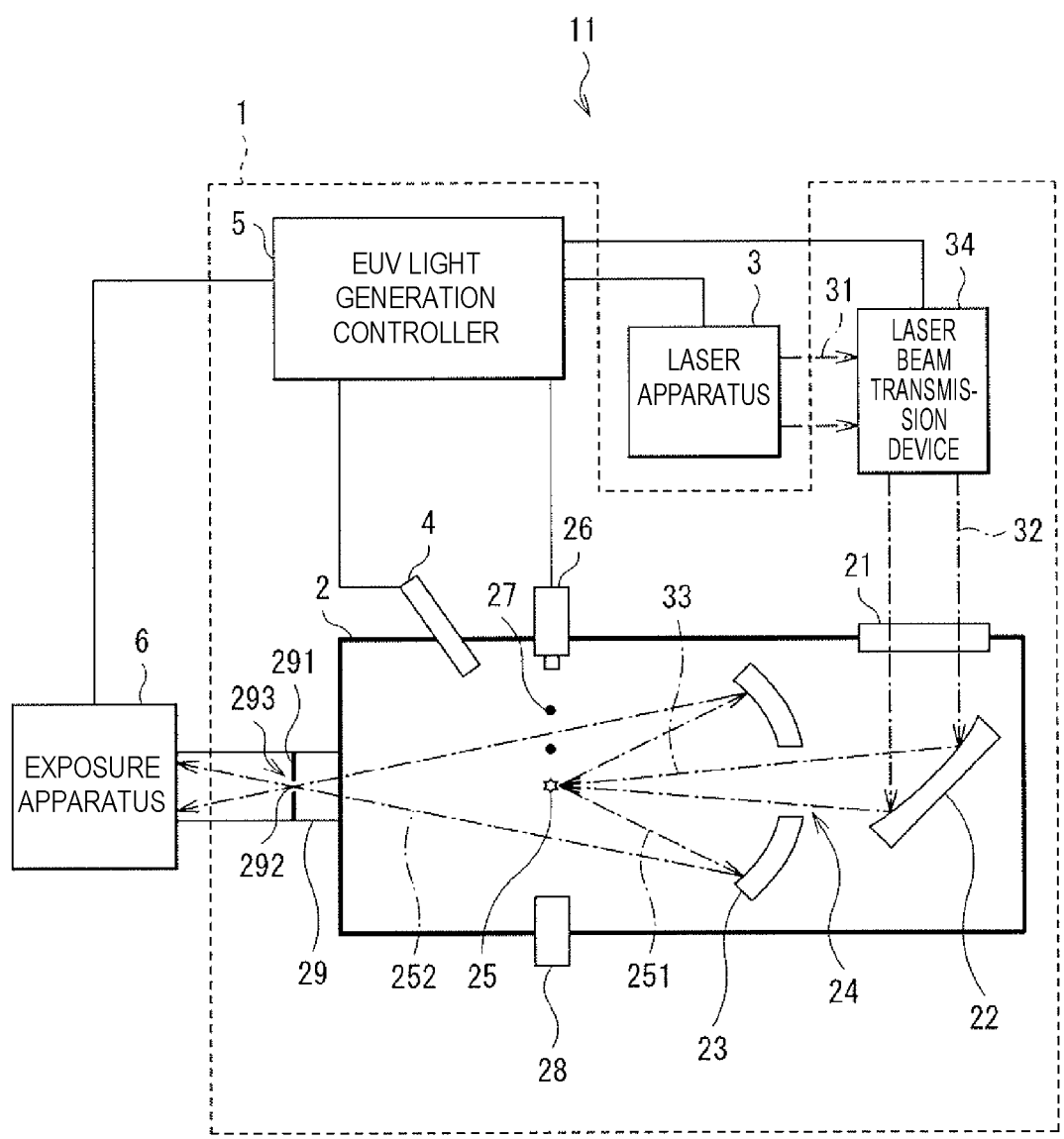
FIG. 1 schematically illustrates an exemplary configuration of an exemplary LPP EUV light generation system.

FIG. 1 schematically illustrates the configuration of an exemplary LPP EUV light generation system. This EUV light generation device 1 is used together with at least one laser apparatus 3 in some cases. In the present application, a system including the EUV light generation device 1 and the laser apparatus 3 is referred to as an EUV light generation system 11. As illustrated in FIG. 1 and described below in detail, the EUV light generation device 1 includes a chamber 2 and a target supply unit 26. The chamber 2 is a sealable container. The target supply unit 26 supplies a target substance into the chamber 2 and is attached, for example, through a wall of the chamber 2. The material of the target substance may contain tin, terbium, gadolinium, lithium, xenon, or a combination of two or more thereof, but is not limited thereto.

The wall of the chamber 2 is provided with at least one through-hole. The through-hole is blocked by a window 21 through which a pulse laser beam 32 output from the laser apparatus 3 is transmitted. For example, an EUV focusing mirror 23 having a spheroidal surface is disposed inside the chamber 2. The EUV focusing mirror 23 has first and second focal points. A multi-layer reflective film in which, for example, molybdenum and silicon are alternately stacked is formed on the surface of the EUV focusing mirror 23. The EUV focusing mirror 23 may be disposed so that, for example, the first focal point is positioned in a plasma generating region 25 and the second focal point is positioned at an intermediate focal point (IF) 292. The EUV focusing mirror 23 is provided, at a central part, with a through-hole 24 through which a pulse laser beam 33 passes.

The EUV light generation device 1 includes an EUV light generation controller 5, a target sensor 4, and the like. The target sensor 4 is configured to detect one or more of the existence, locus, position, and speed of a target 27. The target sensor 4 may have an image capturing function.

The EUV light generation device 1 also includes a connection unit 29 configured to provide communication between inside of the chamber 2 and inside of an exposure apparatus 6. The connection unit 29 includes a wall 291 through which an aperture 293 is formed. The wall 291 is disposed so that the aperture 293 is positioned at the second focal position of the EUV focusing mirror 23.

In addition, the EUV light generation device 1 includes a laser beam transmission device 34, a laser beam focusing mirror 22, a target recovery unit 28 for collecting the target 27, and the like. The laser beam transmission device 34 includes an optical element for defining the transmission state of a laser beam, and an actuator for adjusting the position, posture, and the like of the optical element.

[1.2 Operation]

The following describes operation of the exemplary LPP EUV light generation system with reference to FIG. 1. A pulse laser beam 31 output from the laser apparatus 3 passes through the laser beam transmission device 34 and enters the chamber 2 through the window 21 as a pulse laser beam 32. The pulse laser beam 32 travels along at least one laser beam path in the chamber 2 and is reflected by the laser beam focusing mirror 22 and applied to the at least one target 27 as a pulse laser beam 33.

The target supply unit 26 is configured to output the target 27 made of the target substance toward the plasma generating region 25 in the chamber 2. The target 27 is irradiated with at least one pulse included in the pulse laser beam 33. Plasma is generated from the target 27 irradiated with the pulse laser beam and radiates radiation light 251. EUV light 252 included in the radiation light 251 is selectively reflected by the EUV focusing mirror 23. Having been reflected by the EUV focusing mirror 23, the EUV light 252 is focused at the intermediate focal point 292 and output to the exposure apparatus 6. One target 27 may be irradiated with a plurality of pulses included in the pulse laser beam 33.

The EUV light generation controller 5 is configured to collectively control the entire EUV light generation system 11. The EUV light generation controller 5 processes a result of detection by the target sensor 4. The EUV light generation controller 5 may control, for example, the output timing of the target 27 and the output direction of the target 27 based on the result of detection by the target sensor 4. In addition, the EUV light generation controller 5 may control, for example, the oscillation timing of the laser apparatus 3, the traveling direction of the pulse laser beam 32, and the focusing position of the pulse laser beam 33. These various kinds of control are merely exemplary, and may include other controls as necessary.

<2. Comparative Example> (Laser System Including Laser Beam Transmission Device)

[2.1 Configuration]

Figure 2:
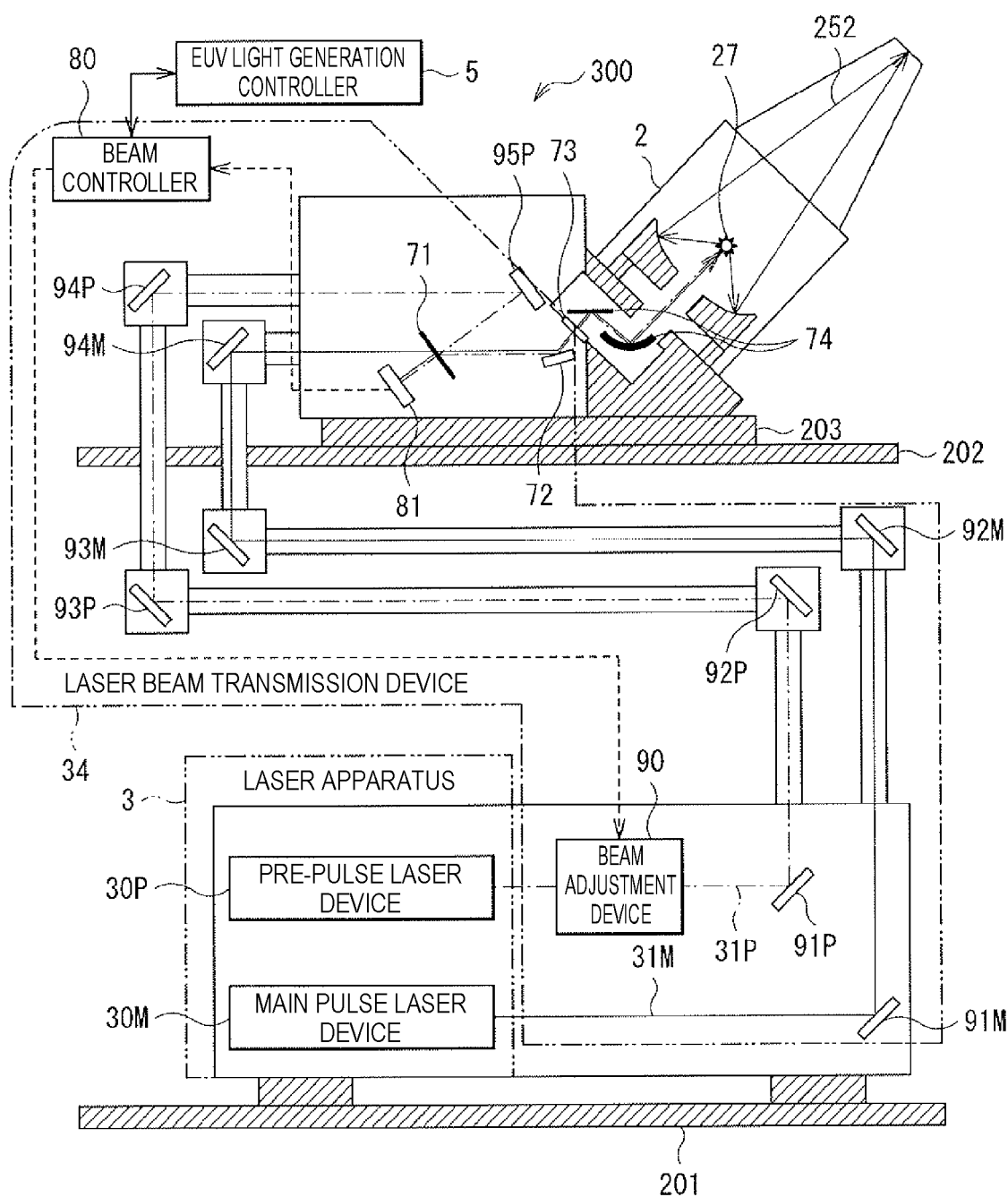
FIG. 2 schematically illustrates an exemplary configuration of a laser system according to a comparative example applied to the EUV light generation system.

FIG. 2 schematically illustrates an exemplary configuration of a laser system 300 according to a comparative example applied to the EUV light generation system 11 illustrated in, for example, FIG. 1. Hereinafter, any component substantially identical to that in FIG. 1 is denoted by an identical reference sign, and description thereof will be omitted as appropriate.

The EUV light generation system 11 may include the chamber 2, the EUV light generation controller 5, and the laser system 300.

As described above, the chamber 2 is an EUV chamber into which the target 27 is supplied to generate the EUV light 252. The chamber 2 is installed on a clean room floor 202 through an installation mechanism 203.

The chamber 2 includes a chamber window 73 through which a pre-pulse laser beam 31P and a main pulse laser beam 31M pass into the chamber 2. The chamber 2 may include a focus unit (FU) 74 through which the pre-pulse laser beam 31P and the main pulse laser beam 31M are focused onto the target 27 supplied therein.

The laser system 300 includes the laser apparatus 3 and the laser beam transmission device 34.

The laser apparatus 3 is installed on a sub fabrication floor 201. The laser apparatus 3 includes a pre-pulse laser device 30P and a main pulse laser device 30M.

The pre-pulse laser device 30P outputs the pre-pulse laser beam 31P having a pulse width in the order of, for example, picoseconds (ps) or nanoseconds (ns).

The main pulse laser device 30M may be a $CO_2$ laser apparatus configured to output the main pulse laser beam 31M. The main pulse laser beam 31M may have a wavelength different from that of the pre-pulse laser beam 31P.

The laser beam transmission device 34 may connect the chamber 2 to the laser apparatus 3.

The laser beam transmission device 34 includes a beam combiner 71, a tilt mirror 72, a combiner sensor 81, a beam controller 80, a beam adjustment device 90, a plurality of reflection mirrors 91M, 92M, 93M, and 94M, and a plurality of reflection mirrors 91P, 92P, 93P, 94P, and 95P.

The beam adjustment device 90 may be disposed on the optical path of the pre-pulse laser beam 31P output from the pre-pulse laser device 30P. The beam adjustment device 90 may be configured to adjust beam parameters of the pre-pulse laser beam 31P. The beam parameters may be, for example, a beam position, a beam shape, a beam cross-sectional area, divergence, wavefront, and a beam traveling direction.

The beam combiner 71 is disposed at a position where the optical path of the pre-pulse laser beam 31P intersects with the optical path of the main pulse laser beam 31M. The beam combiner 71 is disposed to substantially align the optical path of the pre-pulse laser beam 31P output from the beam adjustment device 90 and the optical path of the main pulse laser beam 31M output from the main pulse laser device 30M. The beam combiner 71 may be, for example, a dichroic mirror configured to highly reflect light at the wavelength of the pre-pulse laser beam 31P and highly transmit light at the wavelength of the main pulse laser beam 31M.

The combiner sensor 81 may be a first sensor configured to detect part of the main pulse laser beam 31M and part of the pre-pulse laser beam 31P bifurcated by the beam combiner 71. The combiner sensor 81 may measure, for example, the beam parameters of the pre-pulse laser beam 31P having been transmitted through the beam combiner 71 and the beam parameters of the main pulse laser beam 31M reflected by the beam combiner 71.

The beam controller 80 is connected with the EUV light generation controller 5, the combiner sensor 81, and the beam adjustment device 90.

The reflection mirrors 91M, 92M, 93M, and 94M are disposed so as to form part of a transmission path through which the main pulse laser beam 31M from the main pulse laser device 30M is guided to the chamber 2.

The reflection mirrors 91P, 92P, 93P, 94P, and 95P are disposed so as to form part of a transmission path through which the pre-pulse laser beam 31P from the pre-pulse laser device 30P is guided to the chamber 2.

The tilt mirror 72 may be a reflection mirror including a substrate opaque to the pre-pulse laser beam 31P and the main pulse laser beam 31M, and a metal film formed on the substrate for reflecting the pre-pulse laser beam 31P and the main pulse laser beam 31M. The substrate opaque to the laser beam may be made of SiC or copper. The material of the metal film may be gold. The tilt mirror 72 may be a reflection mirror including a dielectric film in place of the metal film.

The laser beam transmission device 34 includes a transmission optical system disposed on a path between the laser apparatus 3 and the target 27 supplied into the chamber 2. The transmission optical system may include the beam adjustment device 90, the reflection mirrors 91M, 92M, 93M, and 94M, and the reflection mirrors 91P, 92P, 93P, 94P, and 95P.

The laser beam transmission device 34 includes a reflection optical system disposed on a path between the transmission optical system and the target 27. The reflection optical system reflects, toward the target 27, the pre-pulse laser beam 31P and the main pulse laser beam 31M from the transmission optical system. The reflection optical system may include the tilt mirror 72. The focus unit 74 in the chamber 2 may be included in the reflection optical system in the laser beam transmission device 34. The beam combiner 71 may be disposed between the transmission optical system and the reflection optical system.

In addition, the laser beam transmission device 34 may include a plurality of optical path tubes for shielding the transmission path of the pre-pulse laser beam 31P and the main pulse laser beam 31M.

[2.2 Operation]

The laser apparatus 3 may output the pre-pulse laser beam 31P and the main pulse laser beam 31M in this order.

The pre-pulse laser beam 31P is guided to the beam combiner 71 through a transmission path including the beam adjustment device 90 and the reflection mirrors 91P, 92P, 93P, 94P, and 95P. Part of the pre-pulse laser beam 31P is transmitted through the beam combiner 71 and incident on the combiner sensor 81. The pre-pulse laser beam 31P reflected by the beam combiner 71 is introduced into the chamber 2 through the tilt mirror 72 and the chamber window 73.

The main pulse laser beam 31M is guided to the beam combiner 71 through a transmission path including the reflection mirrors 91M, 92M, 93M, and 94M. Part of the main pulse laser beam 31M is reflected by the beam combiner 71 and incident on the combiner sensor 81. The main pulse laser beam 31M having been transmitted through the beam combiner 71 is introduced into the chamber 2 through the tilt mirror 72 and the chamber window 73.

The combiner sensor 81 measures the beam parameters of the pre-pulse laser beam 31P and the beam parameters of the main pulse laser beam 31M.

Values of the beam parameters measured by the combiner sensor 81 are input to the beam controller 80. The beam controller 80 controls the beam adjustment device 90 so that each beam parameter measured by the combiner sensor 81 becomes equal to a desired value.

The target 27 may be diffused by irradiation of the pre-pulse laser beam 31P guided to the chamber 2 and focused by the focus unit 74. Thereafter, the diffused target 27 generates plasma by irradiation of the main pulse laser beam 31M focused by the focus unit 74, and the EUV light 252 is radiated from the plasma.

[2.3 Problem]

The beam controller 80 may detect an alignment anomaly and damage of an optical element upstream on a laser beam path including the beam combiner 71 when any beam parameter measured by the combiner sensor 81 is anomalous. The beam controller 80 may issue an error signal to the EUV light generation controller 5, for example, when significant asymmetry is observed in a beam shape. Having received the error signal, the EUV light generation controller 5 may display, on a display unit (not illustrated), the possibility of damage of an optical element upstream on the laser beam path including the beam combiner 71, and stop outputting of the pre-pulse laser beam 31P and the main pulse laser beam 31M.

The combiner sensor 81 can detect damage or the like of an optical element on an optical path between the beam combiner 71 and the laser apparatus 3, but cannot detect, for example, damage of an optical element, such as the tilt mirror 72, disposed on a path between the beam combiner 71 and the target 27 in the chamber 2. In the laser system 300 according to the comparative example, damage or the like of an optical element on the path between the beam combiner 71 and the target 27 in the chamber 2 can be observed only as decrease of output of the generated EUV light 252. Factors of the decrease of output of the EUV light 252 may include factors other than the path of a pulse laser beam, such as decrease of the reflectance of the EUV focusing mirror 23 and an anomaly of outputting of the target 27. As a result, it takes time or is difficult to specify causes of damage or the like of an optical element on the path between the beam combiner 71 and the target 27 in the chamber 2.

Thus, it is desired to develop a technology of facilitating the specification of damage or the like of an optical element on the path between the beam combiner 71 and the target 27 in the chamber 2.

<3. Embodiment 1> (Laser System Including Return Light Sensor Configured to Detect Return Light of Main Pulse Laser Beam)

The following describes a laser system according to Embodiment 1 of the present disclosure. Hereinafter, any component substantially identical to that of the laser system according to the above-described comparative example is denoted by an identical reference sign, and description thereof will be omitted as appropriate.

[3.1 Configuration]

Figure 3:
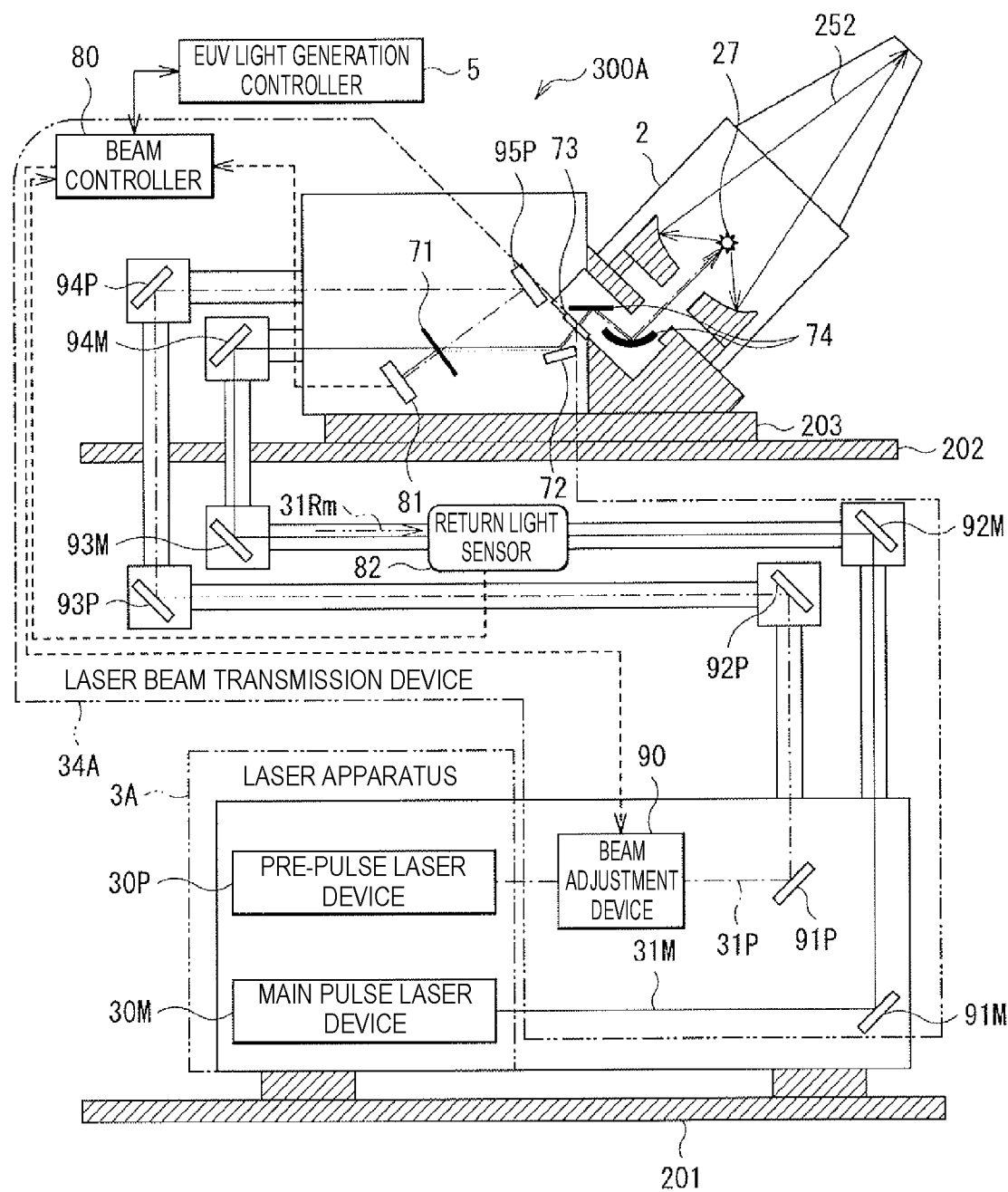
FIG. 3 schematically illustrates an exemplary configuration of a laser system according to Embodiment 1.

FIG. 3 schematically illustrates an exemplary configuration of a laser system 300A according to Embodiment 1.

The EUV light generation system 11 may include the laser system 300A in place of the laser system 300 according to the above-described comparative example.

The laser system 300A includes a laser apparatus 3A and a laser beam transmission device 34A. The laser system 300A also includes a return light sensor 82.

The laser apparatus 3A may have a configuration substantially same as that of the laser apparatus 3 in the laser system 300 according to the above-described comparative example.

The laser system 300A includes the laser beam transmission device 34A in place of the laser beam transmission device 34 according to the comparative example.

The return light sensor 82 only needs to be provided on a path from the tilt mirror 72 of the reflection optical system into the main pulse laser device 30M.

In Embodiment 1, the return light sensor 82 detects part of return light 31Rm traveling backward on the optical path of the main pulse laser beam 31M. The return light sensor 82 may be a power meter configured to detect the light amount of the return light 31Rm. The return light sensor 82 is provided on the optical path of the return light 31Rm of the main pulse laser beam 31M reflected by the tilt mirror 72 and traveling backward to the main pulse laser device 30M, and detects part of the return light 31Rm. Although FIG. 3 illustrates an example in which the return light sensor 82 is disposed between the reflection mirror 93M and the reflection mirror 92M, the return light sensor 82 may be provided on the optical path of the return light 31Rm at another position in the laser beam transmission device 34A.

The return light sensor 82 is connected with the beam controller 80 to output a result of detection of the return light 31Rm to the beam controller 80.

The beam controller 80 may be a control unit configured to determine that the tilt mirror 72 is damaged when no anomaly of the pre-pulse laser beam 31P and the main pulse laser beam 31M is detected by the combiner sensor 81 and the light amount of the return light 31Rm detected by the return light sensor 82 exceeds a predetermined light amount value. The beam controller 80 may determine that the tilt mirror 72 is damaged when the light amount of the return light 31Rm is smaller than a first light amount value as a first threshold and larger than a second light amount value as a second threshold.

The other configuration may be substantially same as that of the laser system 300 according to the above-described comparative example.

[3.2 Operation]

Figure 4:
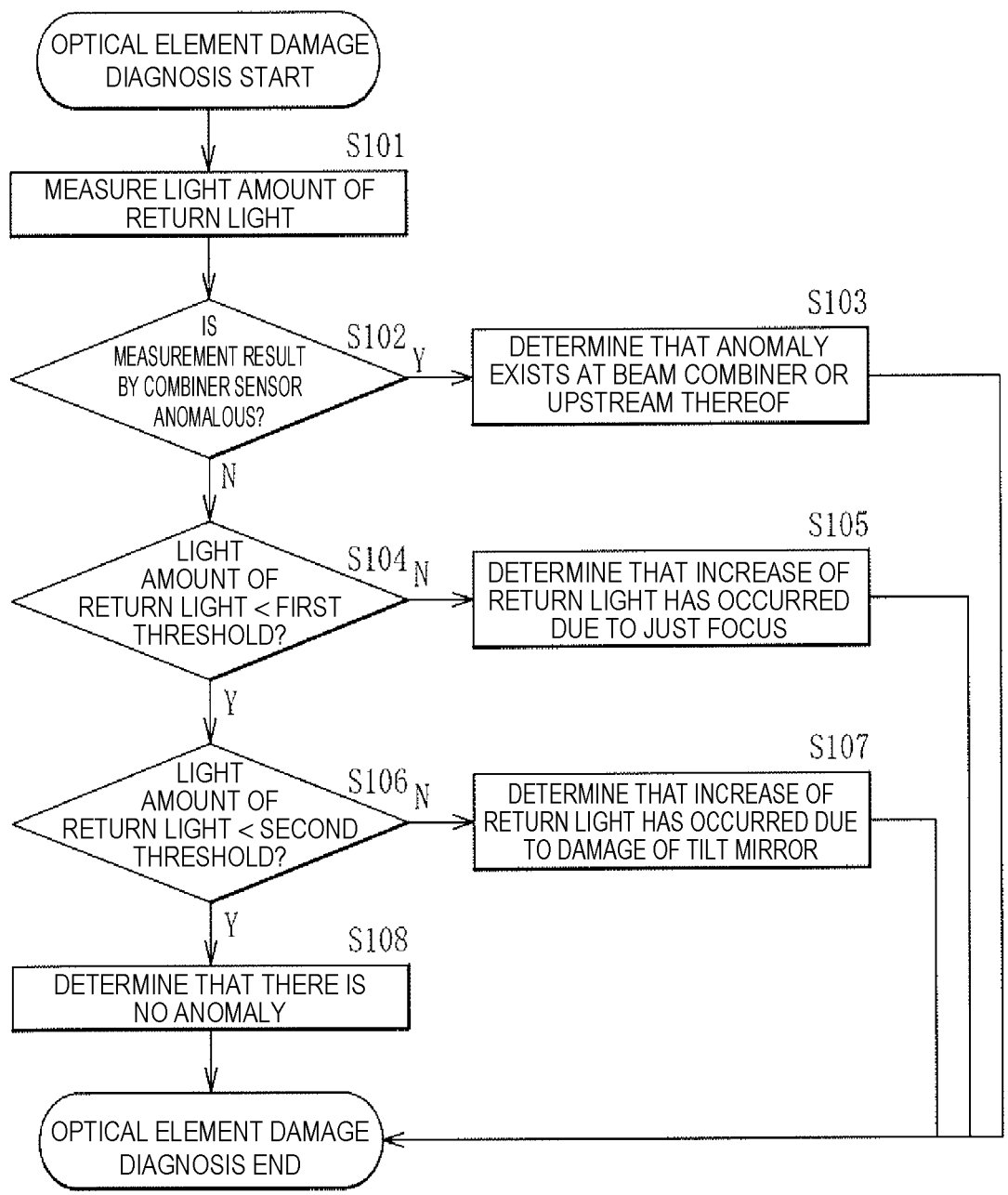
FIG. 4 schematically illustrates an exemplary flowchart of optical element damage diagnosis in the laser system according to Embodiment 1.

FIG. 4 schematically illustrates an exemplary flowchart of optical element damage diagnosis in the laser system 300A according to Embodiment 1.

The beam controller 80 measures, by the return light sensor 82, the light amount of the return light 31Rm of the main pulse laser beam 31M (step S101).

The beam controller 80 determines whether a result of the measurement by the combiner sensor 81 is anomalous (step S102). For example, the beam controller 80 may determine whether the beam parameters of the pre-pulse laser beam 31P and the beam parameters of the main pulse laser beam 31M measured by the combiner sensor 81 are anomalous.

When having determined that the result of the measurement by the combiner sensor 81 is anomalous (N at step S102), the beam controller 80 determines that an anomaly exists at the beam combiner 71 or upstream thereof (step S103), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3A, stop the operation of the laser apparatus 3A, and display, on the display unit (not illustrated), the possibility of damage of an optical element upstream on the laser beam path including the beam combiner 71. Accordingly, an operator may check whether the beam combiner 71 or an optical element upstream thereof is damaged. When an optical element is damaged, the operator may replace the damaged optical element.

When having determined that the result of the measurement by the combiner sensor 81 is not anomalous (Y at step S102), the beam controller 80 detects any anomaly of the return light 31Rm based on a measured value obtained by the return light sensor 82.

Two thresholds for the anomaly detection of the return light 31Rm may be the first threshold and the second threshold. In addition, (First threshold)>(Second threshold) may hold.

The first threshold and the second threshold may be changed for each laser irradiation condition of the pre-pulse laser beam 31P and the main pulse laser beam 31M. For example, the first threshold and the second threshold may be changed based on table data associated with the laser irradiation condition.

The first threshold may be, for example, a value set based on the resistance of an optical element in advance. For example, when the laser system 300A includes an electrooptical (EO) element, the first threshold may be a value set based on the resistance of the EO element in advance.

The second threshold may be a value set based on a typical intensity of the return light 31Rm for each laser irradiation condition. For example, the second threshold may be a value twice as large as the typical intensity of the return light 31Rm for each laser irradiation condition.

Typically, the intensity [W] of return light of a pulse laser beam with which the target 27 is irradiated is proportional to an expression below. In the expression, P represents the output value of the pulse laser beam at the position of the target 27 from which plasma is generated, f represents the laser frequency, D represents the pulse duty of the pulse laser beam with which the target 27 is irradiated, and R represents the ratio of the return light relative to the pulse laser beam with which the target 27 is irradiated. The ratio of the return light may be a value obtained taking into account, for example, the attenuation factor of an isolator provided in the laser system 300A, the amplification factor of a laser amplifier provided in the laser system 300A, and the reflectance of an optical element provided in the laser system 300A.

$$P[mJ]*f[kHz]*D[\%]*R[\%]$$

The beam controller 80 may specify the cause of an anomaly by determining which of the first threshold and the second threshold is exceeded by the measured value of the return light 31Rm obtained by the return light sensor 82.

When "just focus" of the main pulse laser beam 31M on the target 27 occurs, the return light 31Rm abruptly increases and an optical element can be damaged. The "just focus" means a state in which the beam waist position of the main pulse laser beam 31M substantially coincides with the position of the target 27. The first threshold may be set to be a value that allows detection of increase of the return light 31Rm when the "just focus" has occurred.

When damage occurs to an optical element such as the tilt mirror 72 on the path downstream of the beam combiner 71, in other words, the path between the beam combiner 71 and the target 27, light reflected at the surface of the optical element increases, and the return light 31Rm increases. The second threshold may be set to be a value that allows detection of such increase of the return light 31Rm.

The beam controller 80 may determine whether the light amount of the return light 31Rm is smaller than the first threshold based on a measured value obtained by the return light sensor 82 (step S104).

When having determined that the light amount of the return light 31Rm is not smaller than the first threshold (N at step S104), the beam controller 80 determines that increase of the return light 31Rm has occurred due to the "just focus" (step S105), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3A. Then, the EUV light generation controller 5 may perform optical axis adjustment to avoid a "just focus" state. For example, the focusing position of the main pulse laser beam 31M may be shifted from the position of "just focus" through adjustment by a focusing position adjustment mechanism (not illustrated).

When having determined that the light amount of the return light 31Rm is smaller than the first threshold (Y at step S104), the beam controller 80 may subsequently determine whether the light amount of the return light 31Rm is smaller than the second threshold based on a measured value obtained by the return light sensor 82 (step S106).

When having determined that the light amount of the return light 31Rm is not smaller than the second threshold (N at step S106), the beam controller 80 determines that increase of the return light 31Rm has occurred due to damage of the tilt mirror 72 (step S107), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3A, stop the operation of the laser apparatus 3A, and display the possibility of damage of the tilt mirror 72 on the display unit (not illustrated). Accordingly, the operator may check whether the tilt mirror 72 is damaged. When the tilt mirror 72 is damaged, the operator may replace the tilt mirror 72.

When having determined that the light amount of the return light 31Rm is smaller than the second threshold (Y at step S106), the beam controller 80 determines that there is no anomaly (step S108), and ends the processing of the optical element damage diagnosis.

Although the above description is made on the example in which damage of the tilt mirror 72 is detected, damage of another reflection optical system between the beam combiner 71 and the target 27 can be detected in the same manner as in the case of the tilt mirror 72. For example, damage of the focus unit 74 can be detected.

The other operation may be substantially same as that of the laser system 300 according to the above-described comparative example.

[3.3 Effect]

In the laser system 300A according to Embodiment 1, the beam controller 80 can determine damage of an optical element such as the tilt mirror 72 in a short time based on the measured value obtained by the return light sensor 82.

The increase of the return light 31Rm due to damage of an optical element downstream of the beam combiner 71 is smaller than the increase of the return light 31Rm due to "just focus". Thus, when the light amount of the return light 31Rm is larger than the first threshold, it can be determined that the increase of the return light 31Rm has occurred due to the "just focus". When the light amount of the return light 31Rm is smaller than the first threshold and larger than the second threshold, it can be determined that damage has occurred to an optical element downstream of the beam combiner 71, in particular, the tilt mirror 72.

The tilt mirror 72 includes, for example, a substrate made of copper and a metal film made of gold, and thus, the surface of the metal film or the substrate becomes rough when damaged, and scatters the main pulse laser beam 31M in some cases. The scattered light due to the damage of the tilt mirror 72 often has such an intensity that allows detection by the return light sensor 82. Thus, the damage of the tilt mirror 72 can be determined based on a value measured by the return light sensor 82.

<4. Embodiment 2> (Laser System Including Return Light Sensor Inside Main Pulse Laser Device)

The following describes a laser system according to Embodiment 2 of the present disclosure. Hereinafter, any component substantially identical to that of the laser system according to the above-described comparative example or Embodiment 1 is denoted by an identical reference sign, and description thereof will be omitted as appropriate.

[4.1 Configuration]

Figure 5:
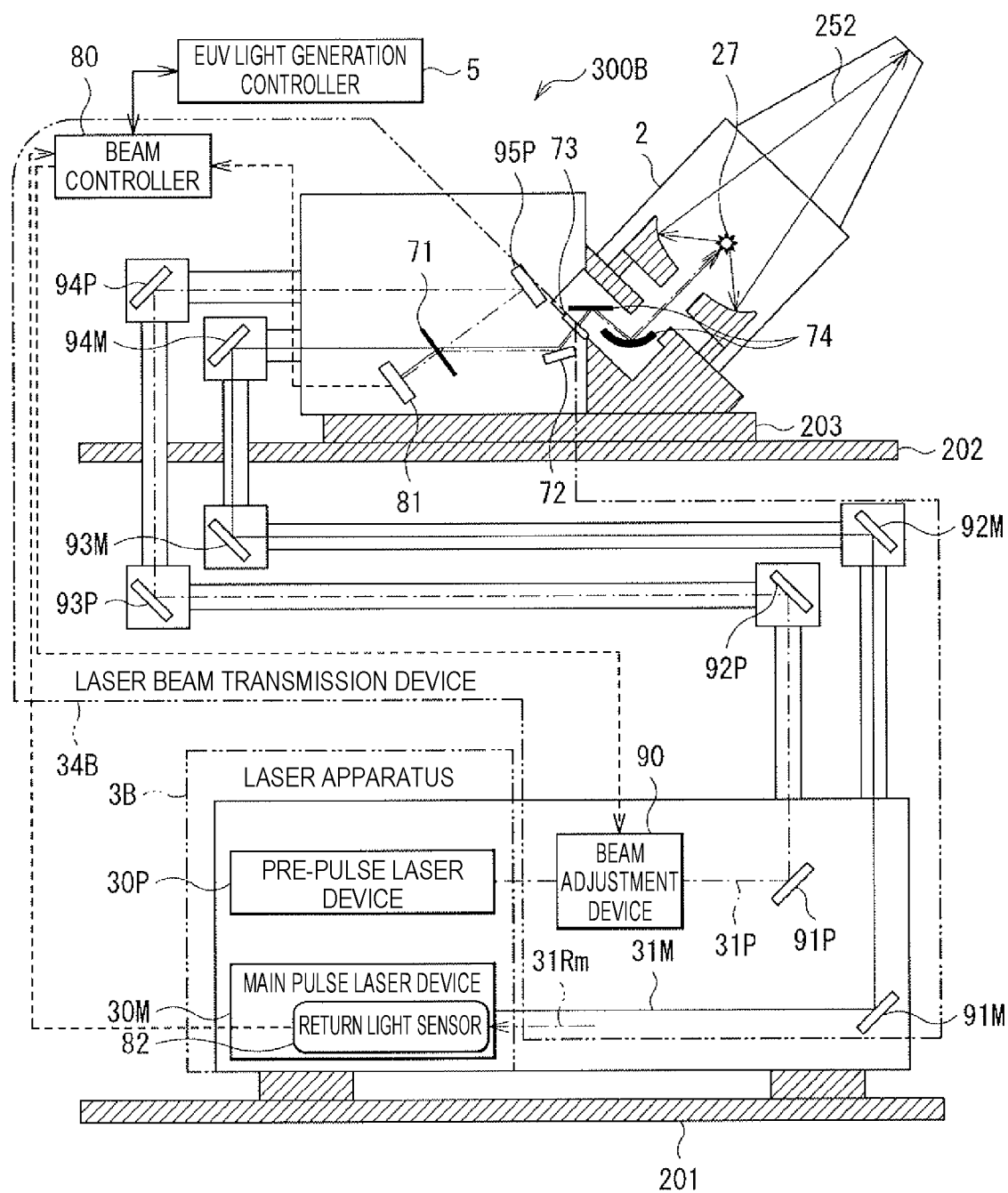
FIG. 5 schematically illustrates an exemplary configuration of a laser system according to Embodiment 2.
Figure 6:
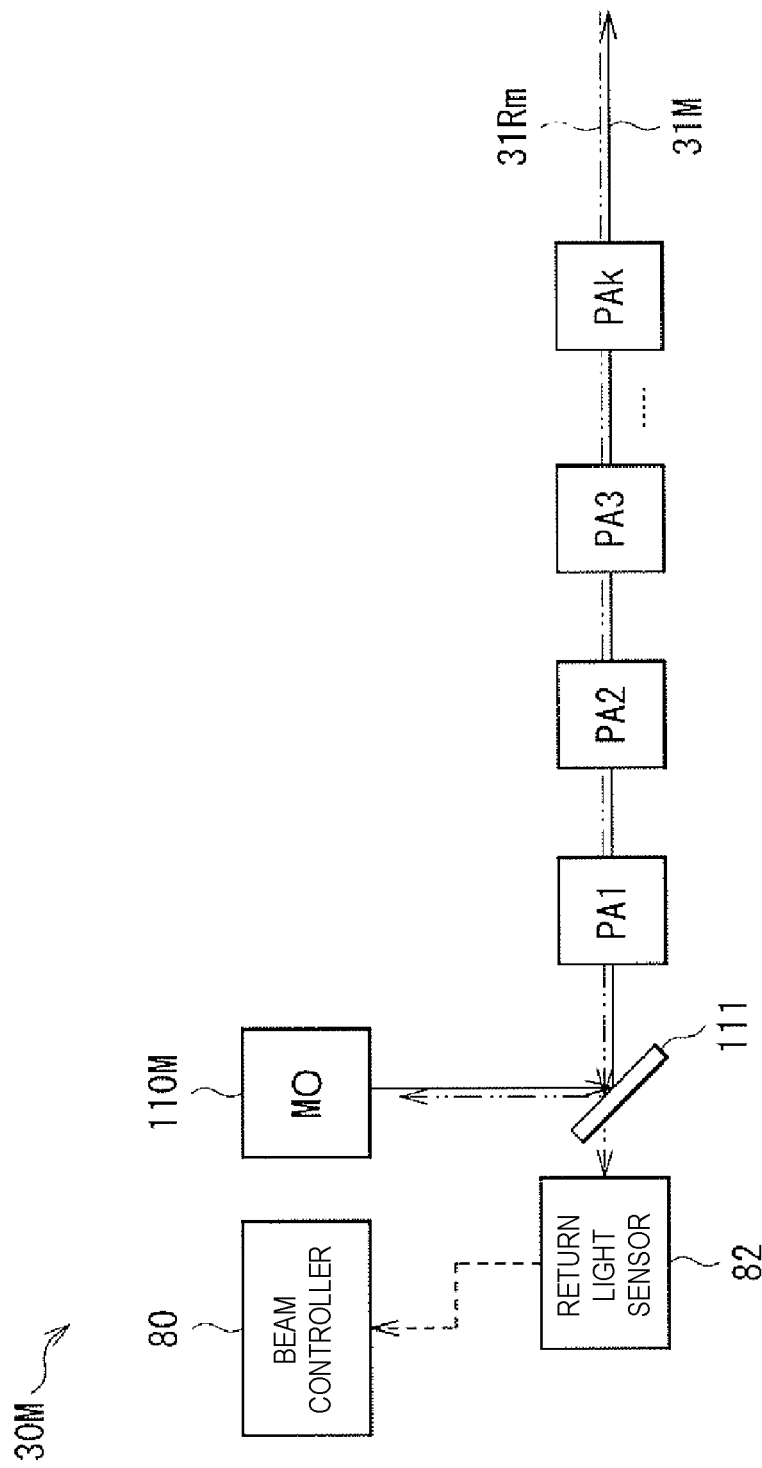
FIG. 6 schematically illustrates an exemplary configuration of a main pulse laser device in the laser system according to Embodiment 2.

FIG. 5 schematically illustrates an exemplary configuration of a laser system 300B according to Embodiment 2. FIG. 6 schematically illustrates an exemplary configuration of the main pulse laser device 30M in the laser system 300B according to Embodiment 2.

The EUV light generation system 11 may include the laser system 300B in place of the laser system 300 according to the above-described comparative example.

The laser system 300B includes a laser apparatus 3B and a laser beam transmission device 34B. The laser system 300B also includes the return light sensor 82.

The configuration of the laser beam transmission device 34B may be substantially same as that of the laser beam transmission device 34 in the laser system 300 according to the above-described comparative example.

In Embodiment 1, the return light sensor 82 is provided on a transmission path at the laser beam transmission device 34A, but in Embodiment 2, the return light sensor 82 is disposed inside the laser apparatus 3B, more particularly, inside the main pulse laser device 30M.

As illustrated in FIG. 6, the main pulse laser device 30M may include a master oscillator (MO) 110M and a laser amplifier. The laser amplifier may include one or more amplifiers PA1, PA2, . . . , PAk. The amplifiers PA1, PA2, . . . , PAk may be each a laser amplifier using $CO_2$ laser gas as a laser medium. Substantially similarly, the main pulse laser device 30M in the laser apparatus 3A according to Embodiment 1 may include the master oscillator (MO) 110M and the laser amplifier.

The main pulse laser device 30M may also include a beam splitter 111 disposed between the master oscillator 110M and the laser amplifier. The return light sensor 82 may be disposed between the master oscillator 110M and the laser amplifier or between two optional amplifiers of the amplifiers PA1, PA2, . . . , PAk. The return light sensor 82 detects the light amount of the return light 31Rm having passed backward through at least one amplifier.

The return light sensor 82 may detect the return light 31Rm bifurcated by the beam splitter 111 disposed on the laser beam path. In FIG. 6, the return light sensor 82 is disposed on the optical path of the return light 31Rm having been transmitted through the beam splitter 111.

The other configuration may be substantially same as that of the laser system according to the above-described comparative example or Embodiment 1.

[4.2 Operation]

Substantially similarly to the case of the laser system 300A according to Embodiment 1, the processing of optical element damage diagnosis in the laser system 300B according to Embodiment 2 may be performed as illustrated in FIG. 4.

However, in the laser system 300B according to Embodiment 2, the return light 31Rm is amplified by the laser amplifier while traveling backward on the laser beam path. When the "just focus" of the main pulse laser beam 31M to the target 27 has occurred or when damage has occurred to an optical element downstream of the beam combiner 71, the return light 31Rm amplified as compared to the case of Embodiment 1 is detected by the return light sensor 82. Thus, the first threshold and the second threshold may be set to be larger than those in Embodiment 1.

The other operation may be substantially same as that of the laser system according to the above-described comparative example or Embodiment 1.

[4.3 Effect]

In the laser system 300B according to Embodiment 2, the amplified return light 31Rm is measured by the return light sensor 82, and thus the first threshold and the second threshold can be set to be larger than those in Embodiment 1. This facilitates identification from noise, and leads to determination in the optical element damage diagnosis at higher accuracy.

The other effect may be substantially same as that of the laser system according to the above-described comparative example or Embodiment 1.

<5. Embodiment 3> (Laser System Capable of Diagnosing Damage of Chamber Window)

The following describes a laser system according to Embodiment 3 of the present disclosure. Hereinafter, any component substantially identical to that of the laser system according to the above-described comparative example or Embodiment 1 or 2 is denoted by an identical reference sign, and description thereof will be omitted as appropriate.

[5.1 Configuration]

Figure 7:
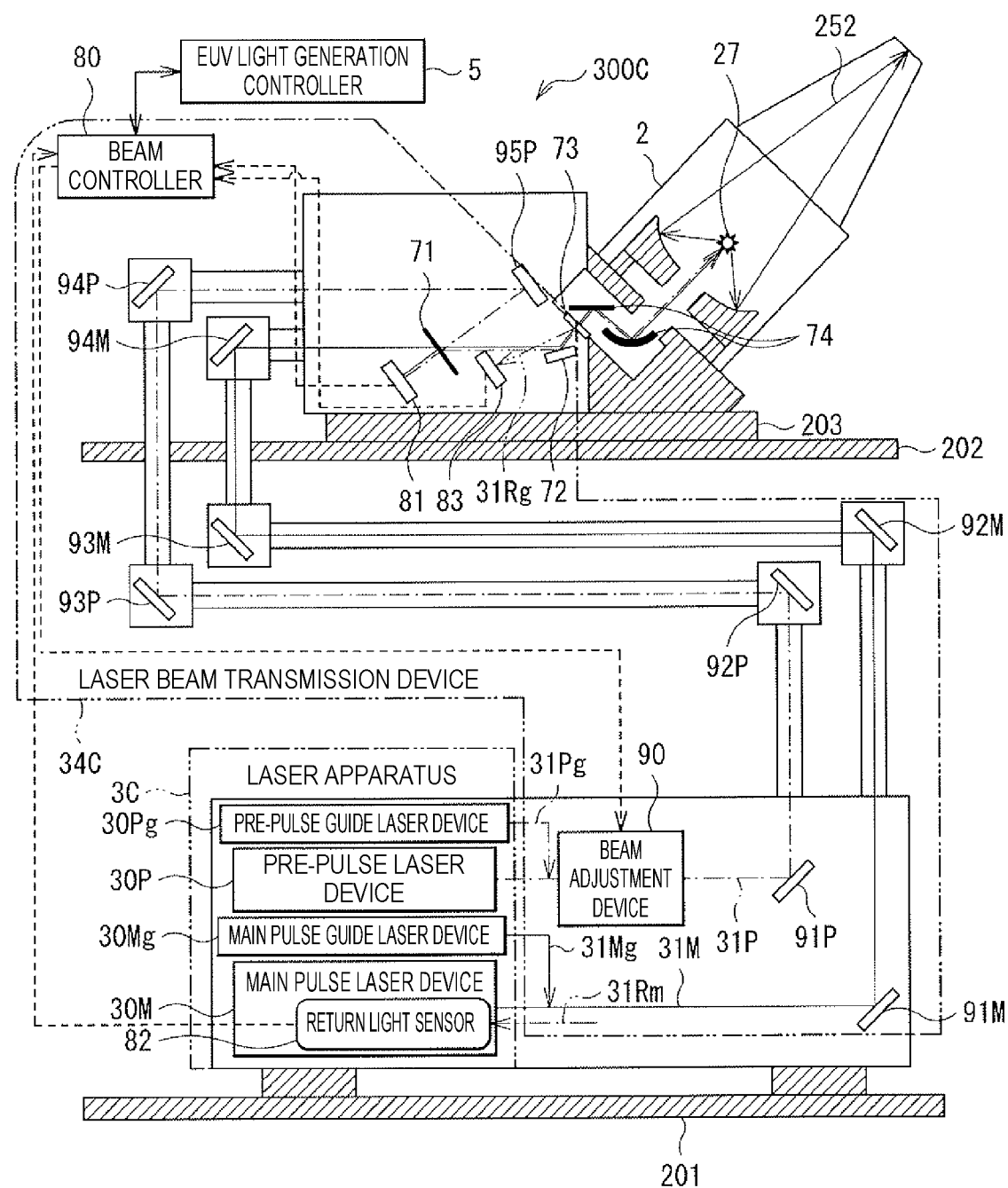
FIG. 7 schematically illustrates an exemplary configuration of a laser system according to Embodiment 3.

FIG. 7 schematically illustrates an exemplary configuration of a laser system 300C according to Embodiment 3.

The EUV light generation system 11 may include the laser system 300C in place of the laser system 300 according to the above-described comparative example.

The laser system 300C includes a laser apparatus 3C and a laser beam transmission device 34C. The laser system 300C also includes the return light sensor 82.

Substantially similarly to Embodiment 2, the return light sensor 82 may be disposed inside the laser apparatus 3C, more particularly, inside the main pulse laser device 30M.

The laser apparatus 3C also includes a reference laser apparatus in addition to the pre-pulse laser device 30P and the main pulse laser device 30M. The reference laser apparatus may include a pre-pulse guide laser device 30Pg and a main pulse guide laser device 30Mg.

The pre-pulse guide laser device 30Pg outputs, as a reference laser beam for the pre-pulse laser beam 31P, a pre-pulse guide laser beam 31Pg having an axis identical to that of the pre-pulse laser beam 31P. The pre-pulse guide laser device 30Pg may output a pre-pulse guide laser beam 31Pg having a wavelength different from that of the pre-pulse laser beam 31P.

The main pulse guide laser device 30Mg outputs, as a reference laser beam for the main pulse laser beam 31M, a main pulse guide laser beam 31Mg having an axis identical to that of the main pulse laser beam 31M. The main pulse guide laser device 30Mg may output the main pulse guide laser beam 31Mg having a wavelength different from that of the main pulse laser beam 31M.

The chamber window 73 may transmit the pre-pulse laser beam 31P and the main pulse laser beam 31M and reflect the pre-pulse guide laser beam 31Pg and the main pulse guide laser beam 31Mg.

The laser system 300C may also include a position sensitive detector (PSD) 83 as a third sensor configured to measure reflected light 31Rg of the main pulse guide laser beam 31Mg and the pre-pulse guide laser beam 31Pg from the chamber window 73.

The PSD 83 may measure the position (X, Y) and intensity of the reflected light 31Rg. When only the optical element damage diagnosis needs to be performed, an optical sensor configured to detect at least the intensity of the reflected light 31Rg may be used in place of the PSD 83.

The beam controller 80 determines whether the chamber window 73 is damaged based on a result of detection of the intensity of the reflected light 31Rg by the PSD 83. The beam controller 80 may be a control unit configured to determine that the chamber window 73 is damaged when the intensity of the reflected light 31Rg is out of a predetermined intensity range in a case where it is determined that the pre-pulse laser beam 31P and the main pulse laser beam 31M are not anomalous and the tilt mirror 72 is not damaged.

The other configuration may be substantially same as that of the laser system according to the above-described comparative example or Embodiment 1 or 2.

[5.2 Operation]

The chamber window 73, through which the pre-pulse laser beam 31P and the main pulse laser beam 31M are introduced into the chamber 2, is sometimes disposed so that the pre-pulse laser beam 31P and the main pulse laser beam 31M are not incident at zero degree. For example, the chamber window 73 is disposed so that the normal of the surface thereof is tilted relative to the laser beam path by several degrees. This is because light reflected at the surface becomes return light when the pre-pulse laser beam 31P and the main pulse laser beam 31M are incident on the chamber window 73 at zero degree. The light reflected at the surface of the chamber window 73 is amplified by the laser amplifier and thus potentially breaks down an optical element upstream of the chamber window 73.

When the chamber window 73 is disposed so that the pre-pulse laser beam 31P and the main pulse laser beam 31M are not incident at zero degree, the light reflected at the surface of the chamber window 73 deviates from the laser beam path. Thus, it is difficult for the return light sensor 82 to detect damage of the chamber window 73. The chamber window 73 is difficult to visually check due to a structural reason, and damage specification takes time. In Embodiment 3, whether the chamber window 73 is damaged is determined based on a result of measurement by the PSD 83.

When the chamber window 73 is damaged, a reflected component at the surface of the chamber window 73 increases, and the intensity of the reflected light 31Rg increases. Depending on the state of the damage, the reflected light 31Rg deviates from a measurement surface of the PSD 83, and the intensity of the reflected light 31Rg decreases.

The beam controller 80 detects any anomaly of the reflected light 31Rg based on the intensity of the reflected light 31Rg measured by the PSD 83.

The anomaly detection of the reflected light 31Rg may use an upper threshold and a lower threshold. The upper and lower thresholds of the anomaly detection of the reflected light 31Rg may be changed for each laser irradiation condition. For example, when X represents an intensity detected by the PSD 83 at normal operation, the upper threshold may be 2× and the lower threshold may be 0.5×.

The beam controller 80 may specify the factor of an anomaly depending on whether the intensity of the reflected light 31Rg measured by the PSD 83 exceeds the upper or lower threshold. This specification assumes a condition that the main pulse guide laser beam 31Mg and the pre-pulse guide laser beam 31Pg measured by the combiner sensor 81 have no anomaly. For example, the specification may assume a condition that one or more of the intensity, position, and size of each of the main pulse guide laser beam 31Mg and the pre-pulse guide laser beam 31Pg is measured to be in a predetermined range.

The upper and lower thresholds of the anomaly detection of the reflected light 31Rg may be set to be values that allow detection of change of the intensity of the reflected light 31Rg when the chamber window 73 is damaged.

Figure 8:
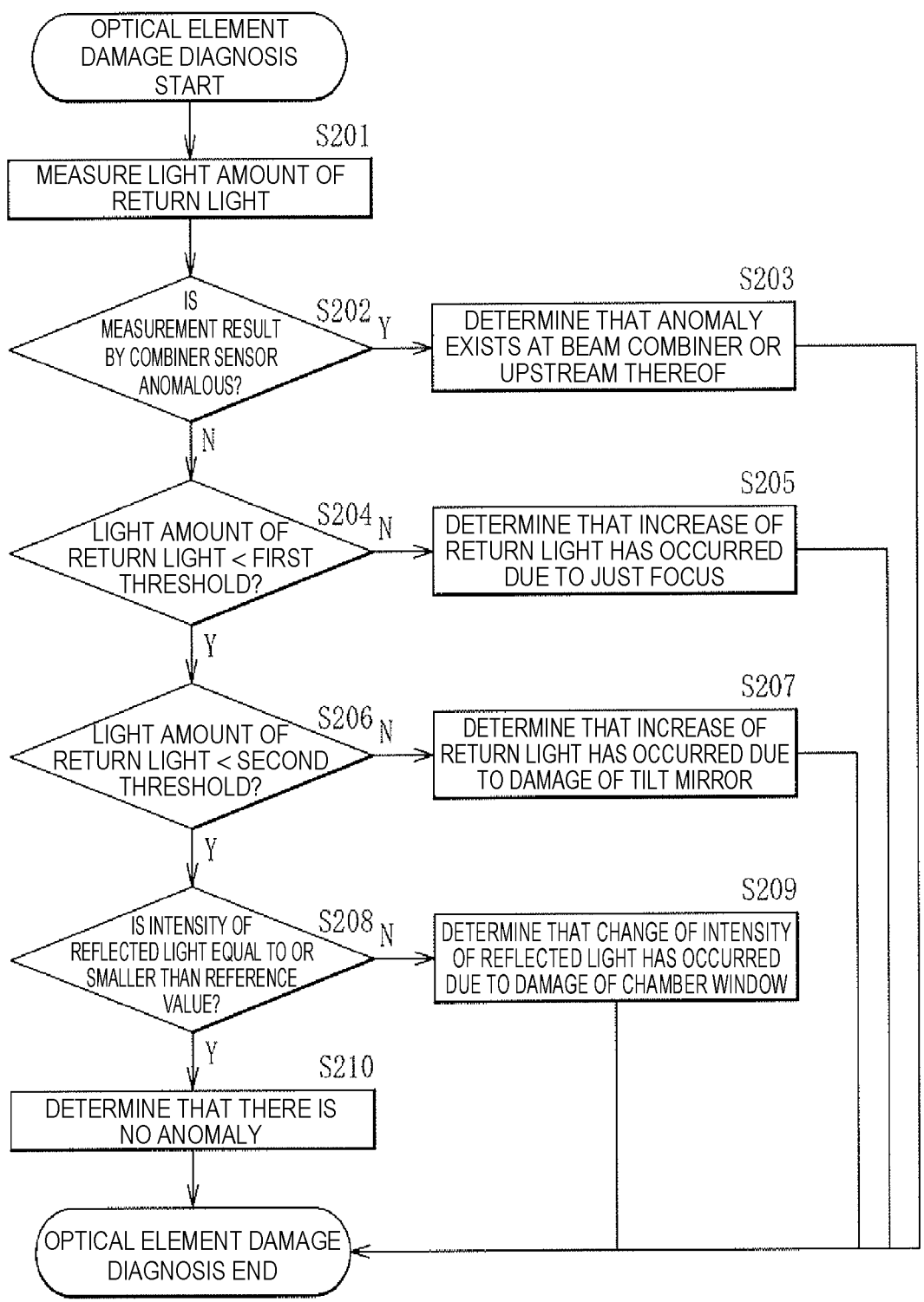
FIG. 8 schematically illustrates an exemplary flowchart of optical element damage diagnosis in the laser system according to Embodiment 3.

FIG. 8 schematically illustrates an exemplary flowchart of the optical element damage diagnosis in the laser system according to Embodiment 3.

The beam controller 80 measures, by the return light sensor 82, the light amount of the return light 31Rm of the main pulse laser beam 31M (step S201).

The beam controller 80 determines whether a result of the measurement by the combiner sensor 81 is anomalous (step S202). For example, the beam controller 80 may determine whether the beam parameters of the pre-pulse laser beam 31P and the beam parameters of the main pulse laser beam 31M measured by the combiner sensor 81 are anomalous.

When having determined that the result of the measurement by the combiner sensor 81 is anomalous (N at step S202), the beam controller 80 determines that an anomaly exists at the beam combiner 71 or upstream thereof (step S203), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3C, stop the operation of the laser apparatus 3C, and display, on the display unit (not illustrated), the possibility of damage of an optical element upstream on the laser beam path including the beam combiner 71. Accordingly, the operator may check whether the beam combiner 71 or an optical element upstream thereof is damaged. When an optical element is damaged, the operator may replace the damaged optical element.

When having determined that the result of the measurement by the combiner sensor 81 is not anomalous (Y at step S202), the beam controller 80 detects any anomaly of the return light 31Rm based on a measured value obtained by the return light sensor 82.

The processing of detection of an anomaly of the return light 31Rm based on the measured value obtained by the return light sensor 82 is substantially same as the processing at steps S104 to S107 in FIG. 4. However, in the laser system 300C according to Embodiment 3, the return light 31Rm is amplified by the laser amplifier while traveling backward on the laser beam path, and the return light 31Rm amplified as compared to the case of Embodiment 1 is detected by the return light sensor 82. Thus, the first threshold and the second threshold may be set to be larger than those in Embodiment 1.

The beam controller 80 may determine whether the light amount of the return light 31Rm is smaller than the first threshold based on a measured value obtained by the return light sensor 82 (step S204).

When having determined that the light amount of the return light 31Rm is not smaller than the first threshold (N at step S204), the beam controller 80 determines that increase of the return light 31Rm has occurred due to the "just focus" (step S205), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3C. Then, the EUV light generation controller 5 may perform the optical axis adjustment to avoid a "just focus" state. For example, the focusing position of the main pulse laser beam 31M may be shifted from the position of "just focus" through adjustment by the focusing position adjustment mechanism (not illustrated).

When having determined that the light amount of the return light 31Rm is smaller than the first threshold (Y at step S204), the beam controller 80 may subsequently determine whether the light amount of the return light 31Rm is smaller than the second threshold based on a measured value obtained by the return light sensor 82 (step S206).

When having determined that the light amount of the return light 31Rm is not smaller than the second threshold (N at step S206), the beam controller 80 determines that increase of the return light 31Rm has occurred due to damage of the tilt mirror 72 (step S207), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3C, stop the operation of the laser apparatus 3C, and display the possibility of damage of the tilt mirror 72 on the display unit (not illustrated). Accordingly, the operator may check whether the tilt mirror 72 is damaged. When the tilt mirror 72 is damaged, the operator may replace the tilt mirror 72.

When having determined that the light amount of the return light 31Rm is smaller than the second threshold (Y at step S206), the beam controller 80 may subsequently determine whether the intensity of the reflected light 31Rg is equal to or smaller than a reference value based on a value measured by the PSD 83 (step S208).

When having determined that the intensity of the reflected light 31Rg exceeds the reference value (N at step S208), the beam controller 80 determines that change of the intensity of the reflected light 31Rg has occurred due to damage of the chamber window 73 (step S209), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3C, stop the operation of the laser apparatus 3C, and display the possibility of damage of the chamber window 73 on the display unit (not illustrated). Accordingly, the operator may check whether the chamber window 73 is damaged. When the chamber window 73 is damaged, the operator may replace the chamber window 73.

When having determined that the intensity of the reflected light 31Rg is equal to or smaller than the reference value (Y at step S208), the beam controller 80 determines that there is no anomaly (step S210), and ends the processing of the optical element damage diagnosis.

The other operation may be substantially same as that of the laser system according to the above-described comparative example or Embodiment 1 or 2.

[5.3 Effect]

In the laser system 300C according to Embodiment 3, damage of the chamber window 73 can be specified in a short time by performing determination with measurement results of the main pulse guide laser beam 31Mg and the pre-pulse guide laser beam 31Pg obtained by the combiner sensor 81 and a measurement result of the intensity of the reflected light 31Rg obtained by the PSD 83.

The other effect may be substantially same as that of the laser system according to the above-described comparative example or Embodiment 1 or 2.

<6. Embodiment 4> (Laser System Including Return Light Sensor Configured to Detect Return Light of Pre-Pulse Laser beam)

The following describes a laser system according to Embodiment 4 of the present disclosure. Hereinafter, any component substantially identical to that of the laser system according to any one of the above-described comparative example or Embodiments 1 to 3 is denoted by an identical reference sign, and description thereof will be omitted as appropriate.

[6.1 Configuration]

Figure 9:
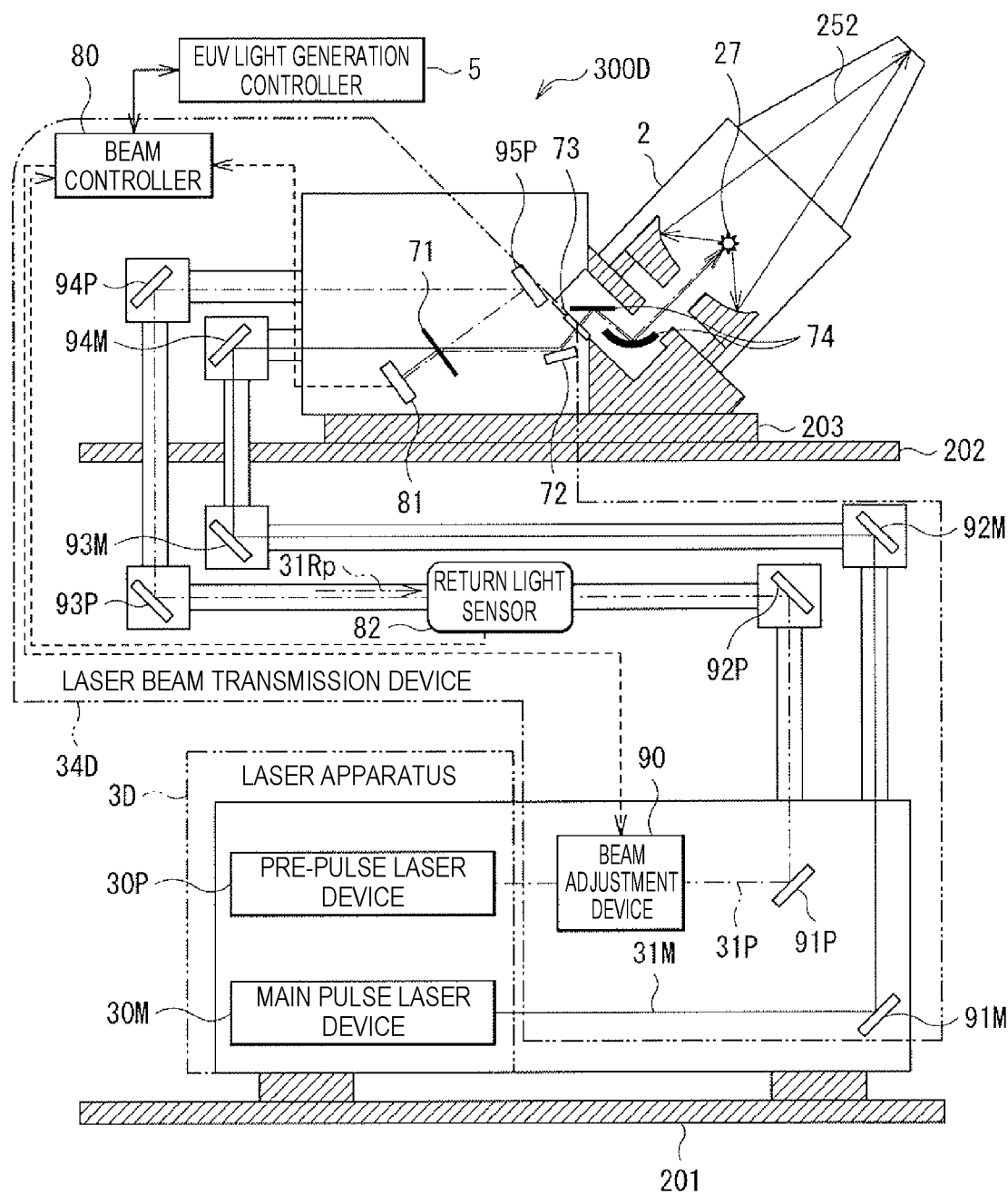
FIG. 9 schematically illustrates an exemplary configuration of a laser system according to Embodiment 4.

FIG. 9 schematically illustrates an exemplary configuration of a laser system 300D according to Embodiment 4.

The EUV light generation system 11 may include the laser system 300D in place of the laser system 300 according to the above-described comparative example.

The laser system 300D includes a laser apparatus 3D and a laser beam transmission device 34D. The laser system 300D also includes the return light sensor 82.

The laser apparatus 3D may have a configuration substantially same as that of the laser apparatus 3 in the laser system 300 according to the above-described comparative example.

In Embodiments 1 to 3, the return light sensor 82 is provided on the path from the tilt mirror 72 as the reflection optical system into the main pulse laser device 30M, but in Embodiment 4, the return light sensor 82 is provided on a path from the tilt mirror 72 into the pre-pulse laser device 30P.

In Embodiment 4, the return light sensor 82 detects part of return light 31Rp traveling backward on the optical path of the pre-pulse laser beam 31P. The return light sensor 82 may be a power meter configured to detect the light amount of the return light 31Rp. The return light sensor 82 is provided on the optical path of the return light 31Rp of the pre-pulse laser beam 31P reflected by the tilt mirror 72 and traveling backward the pre-pulse laser device 30P, and detects part of the return light 31Rp. Although FIG. 9 illustrates an example in which the return light sensor 82 is disposed between the reflection mirror 93P and the reflection mirror 92P, the return light sensor 82 may be provided at another position on the optical path of the return light 31Rp in the laser beam transmission device 34D.

The return light sensor 82 is connected with the beam controller 80 to output a result of detection of the return light 31Rp to the beam controller 80.

The beam controller 80 may be a control unit configured to determine that the tilt mirror 72 is damaged when no anomaly of the pre-pulse laser beam 31P and the main pulse laser beam 31M is detected by the combiner sensor 81 and the light amount of the return light 31Rp detected by the return light sensor 82 exceeds a third threshold as a predetermined light amount value.

The other configuration may be substantially same as that of the laser system according to any one of the above-described comparative example or Embodiments 1 to 3.

[6.2 Operation]

Figure 10:
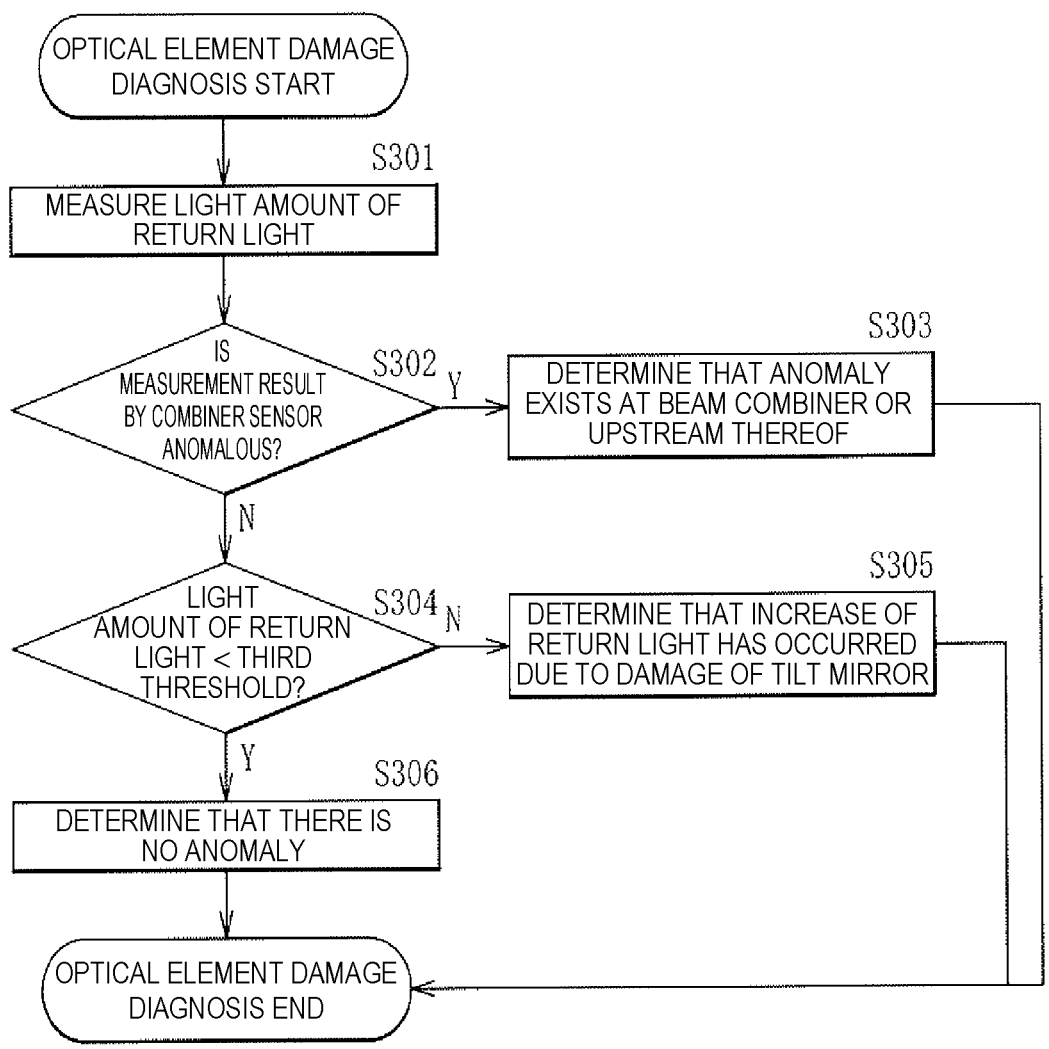
FIG. 10 schematically illustrates an exemplary flowchart of optical element damage diagnosis in the laser system according to Embodiment 4.

FIG. 10 schematically illustrates an exemplary flowchart of optical element damage diagnosis in the laser system 300D according to Embodiment 4.

The beam controller 80 measures, by the return light sensor 82, the light amount of the return light 31Rp of the pre-pulse laser beam 31P (step S301).

The beam controller 80 determines whether a result of the measurement by the combiner sensor 81 is anomalous (step S302). For example, the beam controller 80 may determine whether the beam parameters of the pre-pulse laser beam 31P and the beam parameters of the main pulse laser beam 31M measured by the combiner sensor 81 are anomalous.

When having determined that the result of the measurement by the combiner sensor 81 is anomalous (N at step S302), the beam controller 80 determines that an anomaly exists at the beam combiner 71 or upstream thereof (step S303), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3D, stop the operation of the laser apparatus 3D, and display, on the display unit (not illustrated), the possibility of damage of an optical element upstream on the laser beam path including the beam combiner 71. Accordingly, operator may check whether the beam combiner 71 or an optical element upstream thereof is damaged. When an optical element is damaged, the operator may replace the damaged optical element.

When having determined that the result of the measurement by the combiner sensor 81 is not anomalous (Y at step S302), the beam controller 80 detects any anomaly of the return light 31Rp based on a measured value obtained by the return light sensor 82.

The anomaly detection of the return light 31Rp may use one threshold. In this example, the threshold is referred to as the third threshold. The third threshold may be changed for each laser irradiation condition of the pre-pulse laser beam 31P and the main pulse laser beam 31M. For example, the third threshold may be changed based on table data associated with the laser irradiation condition.

The beam controller 80 may specify the factor of an anomaly by determining whether the measured value of the return light 31Rp obtained by the return light sensor 82 exceeds the third threshold.

When damage occurs to an optical element such as the tilt mirror 72 on the path downstream of the beam combiner 71, in other words, the path between the beam combiner 71 and the target 27, light reflected at the surface of the optical element increases, and the return light 31Rp increases. The third threshold may be set to be a value that allows detection of such increase of the return light 31Rp.

The beam controller 80 may determine whether the light amount of the return light 31Rp is smaller than the third threshold based on the measured value obtained by the return light sensor 82 (step S304).

When having determined that the light amount of the return light 31Rp is not smaller than the third threshold (N at step S304), the beam controller 80 determines that increase of the return light 31Rp has occurred due to damage of the tilt mirror 72 (step S305), and ends the processing of the optical element damage diagnosis. In this case, after the processing of the optical element damage diagnosis, for example, the beam controller 80 may issue an error signal including a diagnosis result to the EUV light generation controller 5. The EUV light generation controller 5 may stop an oscillation trigger to the laser apparatus 3D, stop the operation of the laser apparatus 3D, and display the possibility of damage of the tilt mirror 72 on the display unit (not illustrated). Accordingly, the operator may check whether the tilt mirror 72 is damaged. When the tilt mirror 72 is damaged, the operator may replace the tilt mirror 72.

When having determined that the light amount of the return light 31Rp is smaller than the third threshold (Y at step S304), the beam controller 80 determines that there is no anomaly (step S306), and ends the processing of the optical element damage diagnosis.

The other operation may be substantially same as that of the laser system according to any one of the above-described comparative example or Embodiments 1 to 3.

[6.3 Effect]

In the laser system 300D according to Embodiment 4, the beam controller 80 can determine damage of an optical element such as the tilt mirror 72 in a short time based on the measured value of the return light 31Rp of the pre-pulse laser beam 31P obtained by the return light sensor 82.

The other effect may be substantially same as that of the laser system according to any one of the above-described comparative example or Embodiments 1 to 3.

<7. Embodiment 5> (Laser System Including Return Light Sensor Inside Pre-Pulse Laser Device)

The following describes a laser system according to Embodiment 5 of the present disclosure. Hereinafter, any component substantially identical to that of the laser system according to any one of the above-described comparative example or Embodiments 1 to 4 is denoted by an identical reference sign, and description thereof will be omitted as appropriate.

[7.1 Configuration]

Figure 11:
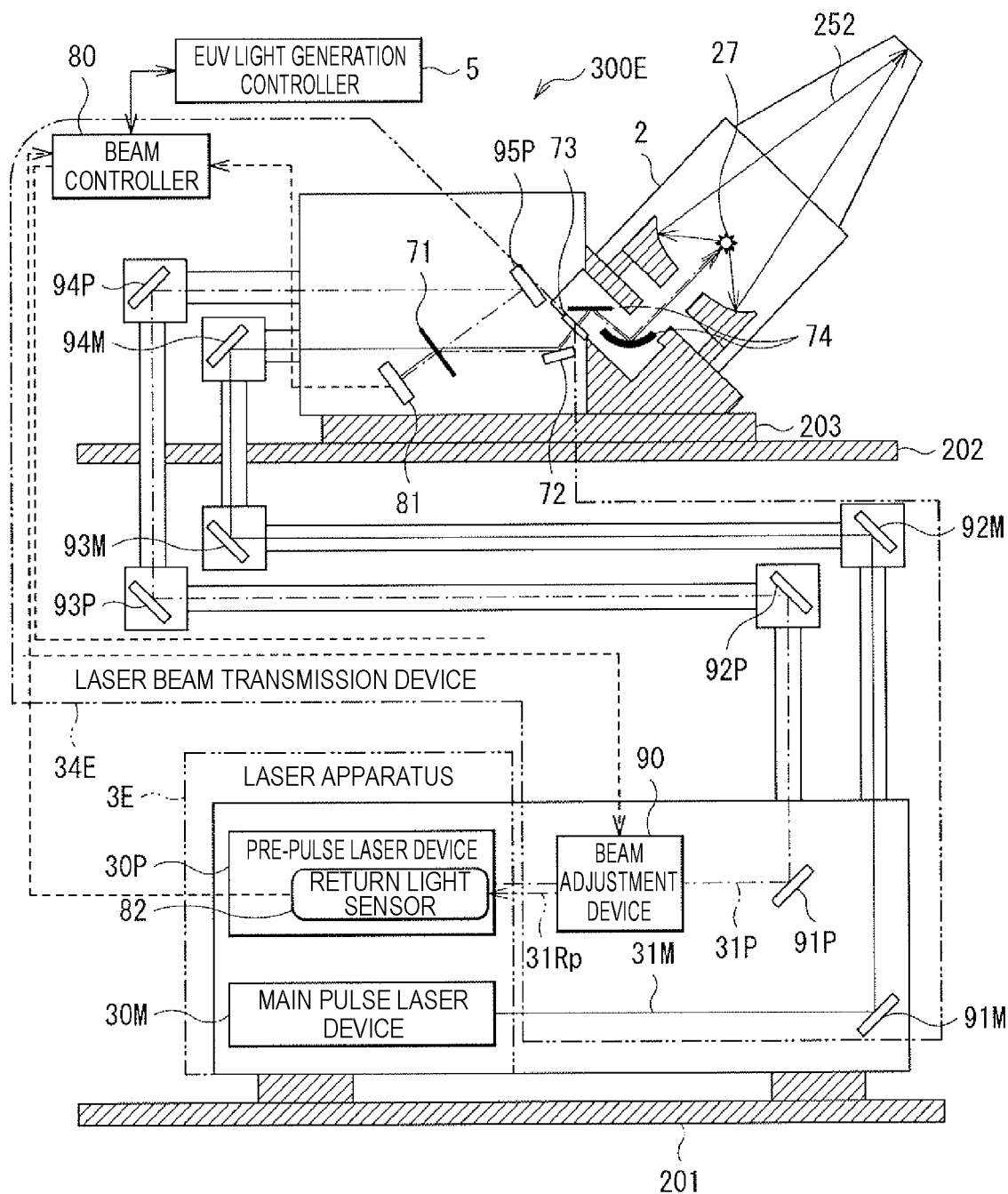
FIG. 11 schematically illustrates an exemplary configuration of a laser system according to Embodiment 5.
Figure 12:
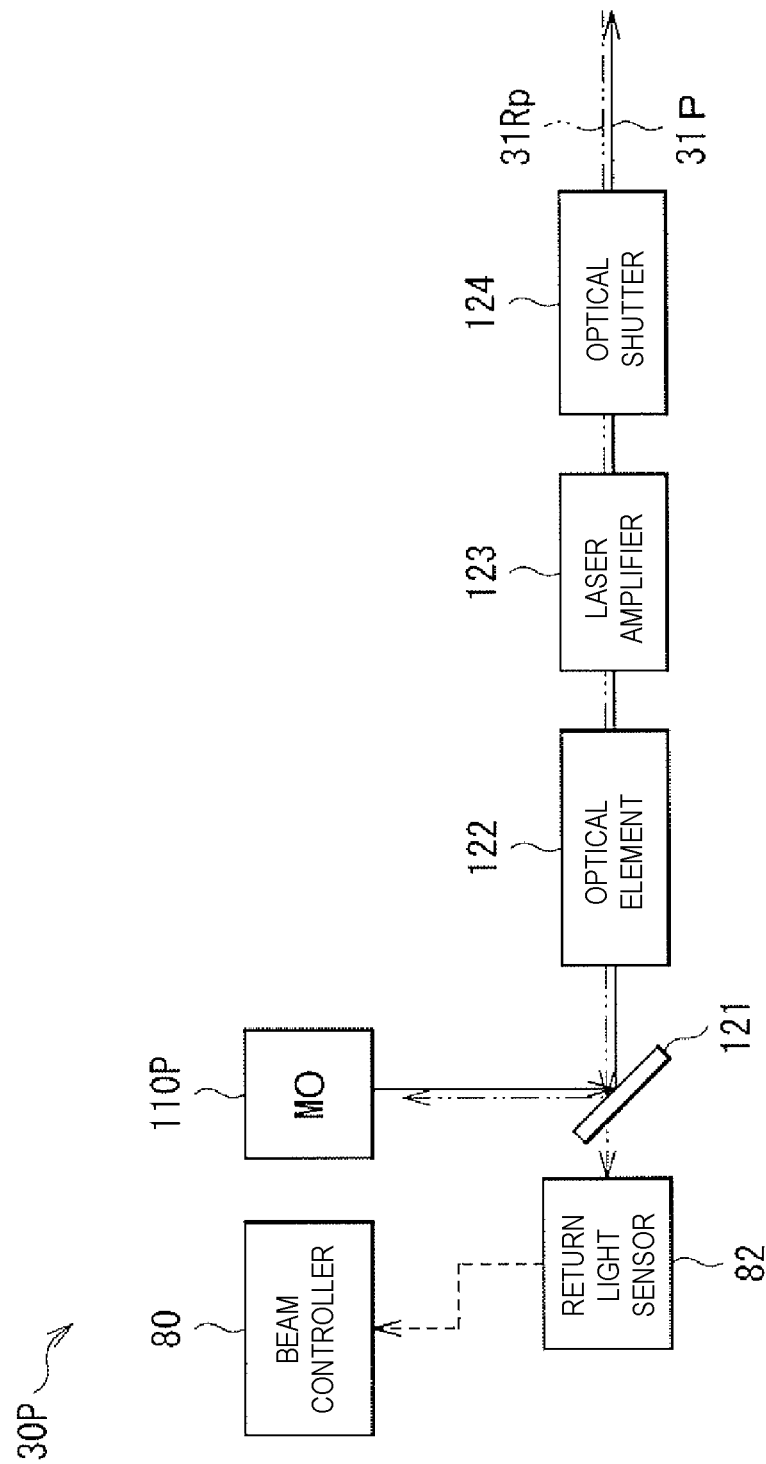
FIG. 12 schematically illustrates an exemplary configuration of a pre-pulse laser device in the laser system according to Embodiment 5.

FIG. 11 schematically illustrates an exemplary configuration of a laser system 300E according to Embodiment 5. FIG. 12 schematically illustrates an exemplary configuration of the pre-pulse laser device 30P in the laser system 300E according to Embodiment 5.

The EUV light generation system 11 may include the laser system 300E in place of the laser system 300 according to the above-described comparative example.

The laser system 300E includes a laser apparatus 3E and a laser beam transmission device 34E. The laser system 300E also includes the return light sensor 82.

The configuration of the laser beam transmission device 34E may be substantially same as that of the laser beam transmission device 34 in the laser system 300 according to the above-described comparative example.

In Embodiment 4, the return light sensor 82 is provided on a transmission path at the laser beam transmission device 34D, but in Embodiment 5, the return light sensor 82 is disposed inside the laser apparatus 3E, more particularly, inside the pre-pulse laser device 30P.

As illustrated in FIG. 12, the pre-pulse laser device 30P may include a master oscillator (MO) 110P, an optical element 122, a laser amplifier 123, and an optical shutter 124. The laser amplifier 123 may include one or more amplifiers. The one or more amplifiers may be a laser amplifier using YAG crystal as a laser medium.

The pre-pulse laser device 30P may also include a beam splitter 121 disposed between the master oscillator 110P and the laser amplifier 123. The return light sensor 82 may be disposed between the master oscillator 110P and the laser amplifier 123. The return light sensor 82 detects the light amount of the return light 31Rp having passed backward through the laser amplifier 123.

The return light sensor 82 may detect the return light 31Rp bifurcated by the beam splitter 121 disposed on the laser beam path. In FIG. 12, the return light sensor 82 is disposed on the optical path of the return light 31Rp having passed through the beam splitter 121.

The other configuration may be substantially same as that of the laser system according to any one of the above-described comparative example or Embodiments 1 to 4.

[7.2 Operation]

Substantially similarly to the case of the laser system 300D according to Embodiment 4, the processing of optical element damage diagnosis in the laser system 300E according to Embodiment 5 may be performed as illustrated in FIG. 10.

However, in the laser system 300E according to Embodiment 5, the return light 31Rp is amplified by the laser amplifier 123 while traveling backward on the laser beam path. The return light 31Rp amplified as compared to the case of Embodiment 4 is detected by the return light sensor 82. Thus, the third threshold may be set to be larger than that in Embodiment 4.

The other operation may be substantially same as that of the laser system according to any one of the above-described comparative example or Embodiments 1 to 4.

[7.3 Effect]

In the laser system 300E according to Embodiment 5, the amplified return light 31Rp is measured by the return light sensor 82, and thus the third threshold can be set to be larger than that in Embodiment 4. This facilitates identification from noise, and leads to determination in the optical element damage diagnosis at higher accuracy.

The other effect may be substantially same as that of the laser system according to any one of the above-described comparative example or Embodiments 1 to 4.

<8. Others>

The above description is intended to provide not restriction but examples. Thus, the skilled person in the art would clearly understand that the embodiments of the present disclosure may be changed without departing from the scope of the claims.

The terms used throughout the specification and the appended claims should be interpreted as "non-limiting". For example, the term "comprising" or "comprised" should be interpreted as "not limited to what has been described as being comprised". The term "having" should be interpreted as "not limited to what has been described as having". It should be understood that the indefinite article "a" in the present specification and the claims means "at least one" or "one or more".

What is claimed is:

1. A laser system comprising:
   a laser apparatus configured to emit a laser beam;
   a transmission optical system disposed on a path between the laser apparatus and a target supplied into an EUV chamber in which extreme ultraviolet light is generated;
   a reflection optical system disposed on a path between the transmission optical system and the target and configured to reflect, toward the target, the laser beam from the transmission optical system;
   a first sensor provided on a path between the transmission optical system and the reflection optical system and configured to detect the laser beam traveling from the laser apparatus toward the reflection optical system;
   a second sensor provided on a path from the reflection optical system into the laser apparatus and configured to detect return light of the laser beam reflected by the reflection optical system and traveling backward to the laser apparatus; and
   a control unit configured to determine that the reflection optical system is damaged when no anomaly of the laser beam is detected by the first sensor and a light amount of the return light detected by the second sensor exceeds a predetermined light amount value.

2. The laser system according to claim 1, wherein the second sensor is disposed inside the laser apparatus.

3. The laser system according to claim 2, wherein
   the laser apparatus includes a master oscillator and at least one laser amplifier, and
   the second sensor detects the light amount of the return light having passed backward through the at least one laser amplifier.

4. The laser system according to claim 1, wherein
   the laser apparatus includes:
     a pre-pulse laser device configured to emit a pre-pulse laser beam;
     a main pulse laser device configured to emit a main pulse laser beam; and
     a beam combiner disposed at a position where an optical path of the pre-pulse laser beam and an optical path of the main pulse laser beam intersect with each other on the path between the transmission optical system and the reflection optical system and configured to substantially align the optical path of the pre-pulse laser beam and the optical path of the main pulse laser beam, and
   the first sensor detects part of the main pulse laser beam and part of the pre-pulse laser beam bifurcated by the beam combiner.

5. The laser system according to claim 4, wherein the second sensor detects part of return light of the main pulse laser beam traveling backward from the beam combiner toward the main pulse laser device.

6. The laser system according to claim 5, wherein the control unit determines that the reflection optical system is damaged when the light amount of the return light is smaller than a first light amount value and larger than a second light amount value which is smaller than the first light amount value.

7. The laser system according to claim 4, wherein the second sensor detects part of return light of the pre-pulse laser beam traveling backward from the beam combiner toward the pre-pulse laser device.

8. The laser system according to claim 1, wherein
   the EUV chamber includes a chamber window through which the laser beam passes into the EUV chamber,
   the laser apparatus includes a reference laser apparatus configured to emit a reference laser beam that travels on an optical path identical to an optical path of the laser beam, the laser system further includes a third sensor configured to detect reflected light of the reference laser beam by the chamber window, and the control unit determines whether the chamber window is damaged based on a result of detection of intensity of the reflected light by the third sensor.

9. The laser system according to claim 8, wherein the control unit determines that the chamber window is damaged when the intensity of the reflected light is out of a predetermined intensity range in a case where it is determined that the laser beam is not anomalous and the reflection optical system is not damaged.

10. The laser system according to claim 1, wherein the reflection optical system includes a reflection mirror including a substrate opaque to the laser beam and a metal film formed on the substrate for reflecting the laser beam.

11. An extreme ultraviolet light generation system comprising:

an EUV chamber in which extreme ultraviolet light is generated;

a laser apparatus configured to emit a laser beam;

a transmission optical system disposed on a path between the laser apparatus and a target supplied into the EUV chamber;

a reflection optical system disposed on a path between the transmission optical system and the target and configured to reflect, toward the target, the laser beam from the transmission optical system;

a first sensor provided on a path between the transmission optical system and the reflection optical system and configured to detect the laser beam traveling from the laser apparatus toward the reflection optical system;

a second sensor provided on a path from the reflection optical system into the laser apparatus and configured to detect return light of the laser beam reflected by the reflection optical system and traveling backward to the laser apparatus; and a control unit configured to determine that the reflection optical system is damaged when no anomaly of the laser beam is detected by the first sensor and a light amount of the return light detected by the second sensor exceeds a predetermined light amount value.

* * * * *